(No Model.) 2 Sheets—Sheet 1.

H. E. DIKEMAN.
DYNAMO ELECTRIC MACHINE.

No. 518,444. Patented Apr. 17, 1894.

Witnesses
G. M. Lamasure
Chas. A. Muzzy

Inventor,
H. E. Dikeman
by
Alexander Davis
Attorneys (No Model.) 2 Sheets—Sheet 2.
H. E. DIKEMAN.
DYNAMO ELECTRIC MACHINE.

No. 518,444. Patented Apr. 17, 1894.

Witnesses
G. M. Lamasure
Chas. H. Duyy

Inventor
Henry E. Dikeman
By Alexander Davis
Attorneys

UNITED STATES PATENT OFFICE.

HENRY E. DIKEMAN, OF BERKELEY, CALIFORNIA.

DYNAMO-ELECTRIC MACHINE.

SPECIFICATION forming part of Letters Patent No. 518,444, dated April 17, 1894.

Application filed February 13, 1894. Serial No. 500,007. (No model.)

*To all whom it may concern:*

Be it known that I, HENRY E. DIKEMAN, a citizen of the United States, residing at Berkeley, in the county of Alameda and State of California, have invented certain new and useful Improvements in Dynamo-Electric Machines, of which the following is a specification, reference being had therein to the accompanying drawings.

My invention relates to an improved machine for converting mechanical energy into electrical energy, or for converting electrical energy into mechanical energy, according as the machine is used as an electric generator, or as an electric motor.

It consists of a novel relation of the axis of the armature to the axis of the field magnets, whereby both the armature and the field-magnets may be rotated at the same time and in the same or in opposite directions; a novel form of the field magnets; a novel collector or transmitter, which collects the electricity generated in the armature and transmits it to the carrier wire; also in a novel method of arrangement of field-magnets and armature, whereby an increased number of magnetic lines may be cut by the armature without a correspondingly increased tendency of the armature or field magnets to fly to pieces through the action of the centrifugal force induced by the rotation.

To more fully describe my invention I refer to the annexed drawings, in which—

Figure 1:
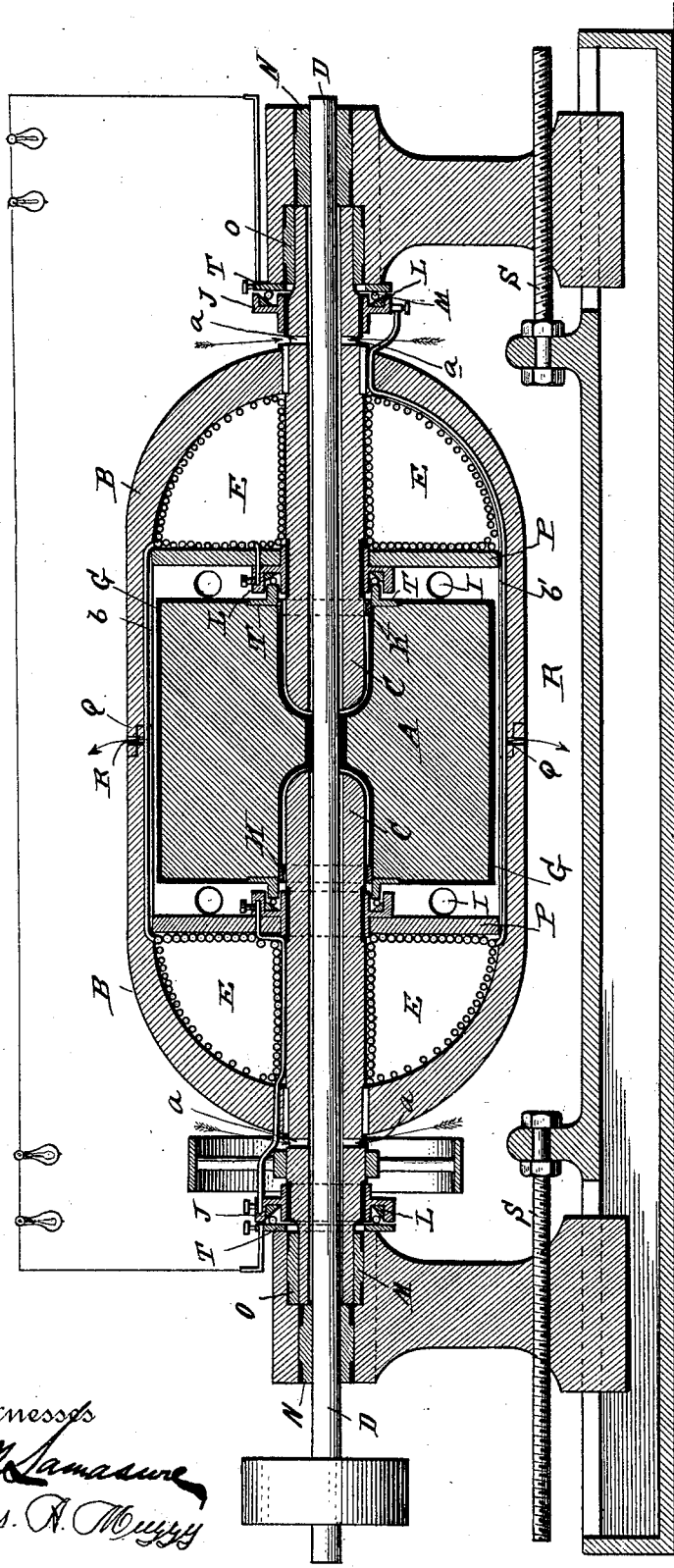
Figure 2:
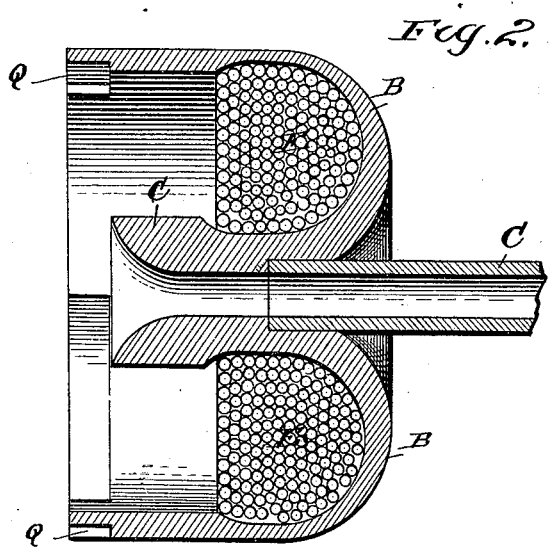
Figure 3:
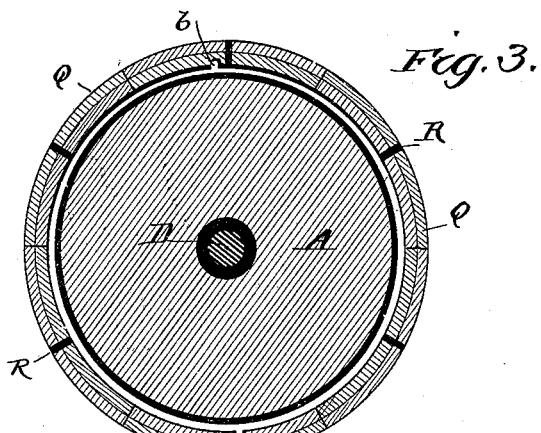

Figure 1 represents a longitudinal section of the machine; Fig. 2 a longitudinal sectional view showing a slight modification of the field magnet; Fig. 3 a cross-section taken on a line drawn centrally through the casing and armature; and Fig. 4 a detached view showing the method of constructing the field magnets.

A, is the armature which is made of some solid conducting material, such as iron or copper, having its opposite ends bored so that it may fit over the pole-pieces C, of the field-magnets, and it is rigidly fastened to the armature-axle D, to which, when the machine is used as a generator, power is applied in some suitable manner to produce rotation. The field magnets are of novel form; they consist of the two cup-shaped shells B, and of the interiorly projecting and hollow-bored or cast pole-pieces C, C, which are extended beyond the shells to the right and left and together with the shells serve as an axle of rotation, whereby the magnetic field may be rotated about the armature. It will be observed that both the armature and field magnets, (and hence the magnetic field) are capable of rotation in either direction, and the rotation of each is independent of the other. Thus, the armature may be rotated to the left at a speed of $n$ turns per second by means of a belt and pulley on shaft D, while at the same time the field-magnets may be rotated to the right at a speed of say $n$ turns per second by means of a belt over the shell itself, or by belt and pulley on C; it is therefore evident that the number of magnetic lines cut per second is the same as if the armature alone were rotated at a speed of $2n$ turns per second, while the tendency of the rotating bodies to fly to pieces is due only to the centrifugal force generated by a speed of $n$ turns per second. The field magnets are magnetized by the wire-coils in the coil-spaces E, and as the two poles projecting within the armature are of the same polarity they each in connection with their respective halves of the inclosing shell form a complete magnetic circuit. Thus, if the coil-spaces be so filled and the current sent through them in such a direction as to make the two interior poles both positive, then will that part of the two shells immediately surrounding the armature be both of negative polarity, and the tendency of the flow of magnetism will be radially from the surfaces of the interior poles to the exterior shells, forming a magnetic field in which the armature rotates. This magnetic field will be most dense immediately surrounding the interior pole-pieces and least dense on the interior of the shells, since the same number of magnetic lines that leave the surfaces of the interior pole-pieces are distributed over the shell which has a much larger surface-area than have the interior poles. The interior pole-pieces C, C, are hollow-bored or cast to allow of the insertion of the axle of the armature, so that both the field magnets and the armature have a common geometrical axis. The diameter of this bore should be somewhat larger than the diameter of the axle of the armature, and on the outside extension of the poles small holes $a$ should be bored radially to the interior bore so that they in connection with the bore may serve as passage-ways to admit air to the interior of the dynamo for cooling purposes. At the right and left of the dynamo at N, N and O, O I have shown how, when the machine is used as a generator, the axle of the armature and the axle of the field magnets can each have separate bearings, so that the heating of the same in either case shall be due only to the separate revolution of the armature or of the field magnets. The collectors, or transmitters, of which four are shown in the drawings, one at each end of the armature, and one at each end of the axle of the field magnets, each consists of four parts. The hollow-shaped ring J, with cross-section as shown, surrounds the axle, C, of the field magnets and is properly fastened thereto, but insulated from the same. In the rectangular groove of ring J, is placed a ring L having a triangular-shaped cross-section with the bevel-face inclined toward the ring-plates T. In the drawings, the plates T, in the two interior collectors are shown as projecting from the armature itself. Between the ring L and the ring-plate T is an annular space having a triangular cross-section in which are placed a number of spherical balls M, of good conducting material, so that when the armature is at rest there is always contact between the plates T and the ring L, through the balls M, which by gravity drop to the lower side of the triangular ring-space, and when the armature or field magnets are in rotation the centrifugal force urges the balls into contact all around the triangular ring-space inclosing them. The rings L, L are inserted so that when worn they may be easily replaced without replacing the rings J.

Operation: Suppose the field-magnets are series-wound, $i.\ e.$, the current generated in the armature shall also magnetize the core of the field magnets, and that the armature be so rotated that the current generated shall pass out at the right let us then trace the path of the current: The current will originate in the armature and in every part of it at the same time, since the moment rotation begins every part of it is cutting lines in the magnetic field, and the electric current generated in every part has a tendency to move in one direction, $i.\ e.$, as assumed above, to the right. This current will pass through the plate T, thence through the balls M, to the ring L, to the ring J, at the top of which latter is shown a binding-post to hold the conducting-wire, thence through the conducting-wire around the right-hand interior pole to the field magnet, thence through the wire laid in a channel $b$ on the inner side of the rotating shell, back to the left-hand magnet-coil, through this and thence returning through a similar channel $b'$ on the interior of the magnet-shell and out through a hole in the right end of same to the binding-post on ring J, of right-hand collector, through J and ring L and balls M, to plate T, to the wire attached to binding post at top of T, thence through the outside circuit, returning to the binding-post and plate T, of left outside collector; thence through the rings and balls to wire and binding post at top of ring J, through wire entering left-hand shell, in an opening for that purpose, to the binding post at top of left-hand interior collector, through the collector and into the armature again. The two polar shells B, are somewhat thickened where their axial poles pass through; this is done in order to give sufficient area of contact to allow of a free flow of the magnetism from the exterior to the interior poles. The advantage to be derived from this form of field-magnet, in which the yoke connecting the two poles entirely surrounds the exciting coil and the excited core, is that there is no room for magnetic leakage and a larger percentage of the excited magnetism is directed into the magnetic circuit to do useful work.

I, I are hand-holes closed with screw-covers and are made in the shell to allow of an inspection of the interior.

K, K are metallic rings freely surrounding the poles C, of the field magnets, but rigidly fastened to the ends of the armature from which they are insulated. Their purpose is to prevent any vibration or gyrostatic action of the armature, as might happen when the dynamo is used as a railway or other motor, from tearing loose the insulation between armature and poles C, C by striking the armature against said poles.

R, R are air vents in the shell to allow of free circulation of the air for cooling purposes. The air will be drawn into the machine through the openings at $a$ in between the armature and field magnet axles, and will thus pass around the ends of the poles C, C and out through the ball-spaces in the collectors, keeping them clean and cool, thence it will pass around the armature edges and out through R, thus tending to keep all parts cool and at an even temperature.

P, P are plates of non-magnetic material and are intended to assist in holding the magnetic coils in place.

In the drawings, Fig. 1, the pole pieces C, C are shown as of separate material from the shell and are rigidly fastened to the shell by means of keys shown at the outside extremity of the shells this construction enabling the parts to be made of different magnetic materials.

S, S are screws which serve to adjust the standards to the right and left in grooves in the bed plates. The object of moving the standards is to give access to the interior by slipping apart the shells.

Q, Figs. 1 and 2 show a series of interlacing overlapping flanges on the ends of the shells whereby the two shells are held and rotated together; but this might be more economically done by turning the edges of the shells smooth and uniting the same by boring holes and inserting metallic dowel pins, half of each pin projecting into each shell.

G is the insulation which covers the entire surface of the armature, except where the armature makes contact with the collectors. All other parts of the dynamo should be properly insulated wherever there is liability of the electricity escaping from its proper course and forming a short circuit.

Figs. 1 and 2 show two different forms of field magnets. This difference is due to structures only and not to principle. In Fig. 1, the interior pole piece is shown as of separate material from the inclosing shell, while in Fig. 2 it is shown integral with the shell, with the axle for rotation inserted.

Figure 4:
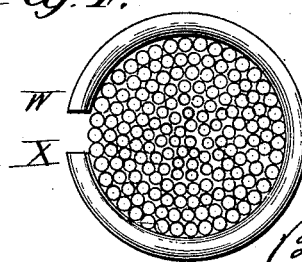

The principle upon which the construction of this form of magnetic field depends is as follows: If a piece of iron, wire or other material that is a good conductor of magnetism be bent so as to inclose a conductor in which an electric current is passing, then will this wire form the path of a magnetic circuit. If the two ends of the bent wire do not meet the wire will be a magnet of which one end is of north polarity and the other of south polarity. In Fig. 4, such a bent wire is shown, inclosing a number of electrical conductors; the currents are all supposed to flow in one direction. Now, if this bent wire be rotated about any axis outside of itself, but in its own plane, then will every point in it describe a circle and every point in the north polar face will describe a circle that will have a corresponding circle opposite it, formed by its opposite point in the south polar face, while the electric conductors during the rotation will describe circles which form an electric exciting-coil, and the whole will constitute a field magnet inclosing an exciting coil. It is evident that the original generating wire may be bent into any form, whatever, and whether this be a circle, triangle, rectangle, ellipse or any other form, the principle that it will constitute a magnetic circuit still holds true; and it is further evident that it may be rotated about any axis outside of itself, but in its own plane, and an equally diverse variety of forms of field magnets may be generated. In Fig. 1, the generating element is of quadrantal form and in Fig. 3 it is of circular form, and in both cases the axis of rotation is horizontal. The most suitable form of generating element for any one dynamo depends upon various conditions. A minimum expenditure of magnetizing power will give a maximum of effective magnetism when the iron parts of the dynamo are so disposed that they constitute together a magnetic circuit having a minimum magnetic reluctance. A circuit of minimum magnetic reluctance inclosing a given area is a circle, but aside from this circuit we must have a cross-sectional form of exciting coil that will keep the heat, generated in it by the passage of the electric current, below a certain temperature. To do this it is necessary to have a sufficient surface about the exciting coil which may vary the form of the magnetic circuit and require some other form than that of a circle. But however the forms of the exciting coil and field magnets may vary, in a dynamo constructed on the foregoing principles, every part of the rotating armature is cutting magnetic lines at every instant, and the current generated in every part is in the same direction; it will also be seen that the armature, the circular poles of the field magnets and the exciting coil are all concentered on the same geometric axis. The above new form of field magnet bears a certain resemblance to the Gramme ring. In the Gramme ring, however, we have a magnetic conductor surrounded by an electrical exciting coil; in this we have an electrical exciting coil surrounded or nearly surrounded by a magnetic conductor that forms a path of a magnetic circuit. If, as in Fig. 1, the interior pole be of wrought iron while the exciting shell be of cast iron then may the poles C on account of the greater magnetic permeability of wrought iron over cast iron be of smaller cross-section than would be necessary if of cast iron, as in Fig. 2; but this advantage in size is somewhat offset by the break in the magnetic circuit where the two metals are in contact, which increases the magnetic reluctance and therefore decreases the effective magnetism of the exciting coils. A separable pole piece allows the exciting coil to be wound separately and with greater ease than would be the case if wound within the shell. In Fig. 2 the pole pieces are somewhat thickened at their faces; this is done merely to give greater direction to the magnetic lines so that all will pass through the armature instead of some around the ends.

It will be observed that this invention is not limited in scope to the specific construction shown, as the same may be varied without departing from the spirit of the invention in the least.

Having thus fully described my invention, what I claim, and desire to secure by Letters Patent, is—

1. In a dynamo electric machine, a field magnet having an exterior circular-faced magnetic-pole and an interior circular-faced magnetic-pole, forming a substantially uniform annular magnetic field, means for rotating the poles together whereby the annular magnetic field may be bodily rotated, a rotating cylindrical armature journaled concentrically with the magnetic-poles and moving within the magnetic-field, whereby the lines of force constituting said magnetic field cut the armature about its entire peripheral surface, substantially as described.

2. In a dynamo electric machine, the combination of the rotary shell and longitudinal central cores, and the rotary armature hollowed longitudinally to form recesses at opposite sides, into which recesses extend said cores, whereby a magnetic field encompassed virtually by the entire body of the armature is presented to such armature, substantially as described.

3. In a dynamo electric machine, the combination of rotating inner and exterior poles and the exciting coils, whereby the magnetic field may be rotated, said inner poles having exterior extensions which form the axles of rotation, and the adjacent edges of the outer poles being connected together, and an armature, substantially as described.

4. An electrical collector having, as a means of electrical transmission between parts movable with respect to each other, the loose, rolling parts moving in an annular space triangular in cross-section, so that the centrifugal and gravity forces shall always hold the rolling parts against the moving parts between which is to be a transfer of the electricity, substantially as described.

5. An electrical collector consisting of a rotating member, another member supported adjacent to the rotating member and forming therewith an annular space, and loose, independent, rolling conducting-devices inclosed within said annular space, the centrifugal and gravity forces causing said devices to establish a rolling electrical contact between said members, substantially as described.

6. In a dynamo electric machine, the combination of a base, sliding standards thereon, means for adjusting the standards to and from each other, a shaft journaled in the standards and carrying an armature, and the separable field magnets also journaled upon the standards in independent bearings, substantially as described.

In testimony whereof I affix my signature in presence of two witnesses.

HENRY E. DIKEMAN.

Witnesses:
CHARLES D. DAVIS,
WM. R. DAVIS.